May 28, 1946.  S. PILE  2,401,100
FLEXIBLE POWER TRANSMISSION MEMBER
Filed Nov. 1, 1943
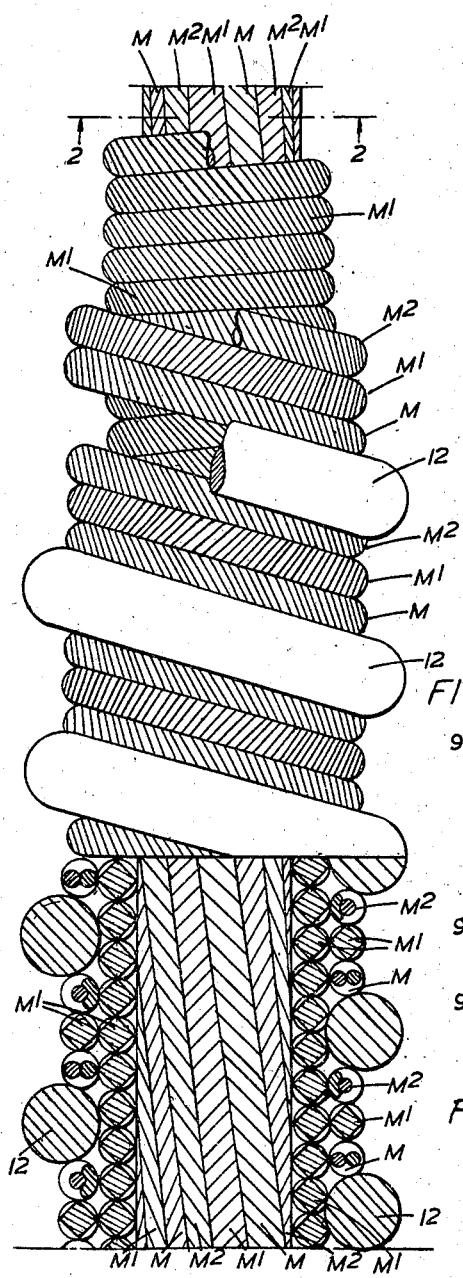
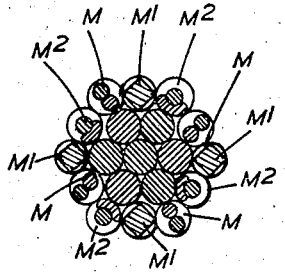
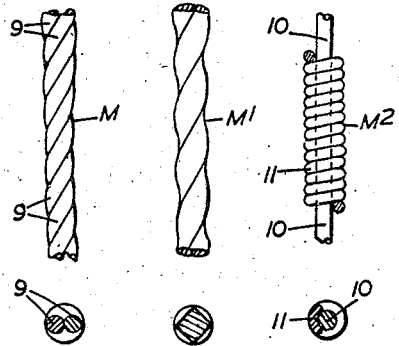
Inventor
SYDNEY PILE
By
Attorney Patented May 28, 1946

2,401,100

UNITED STATES PATENT OFFICE 2,401,100

FLEXIBLE POWER TRANSMISSION MEMBER

Sydney Pile, London, England, assignor to Teleflex Products Limited, London, England, a British company Application November 1, 1943, Serial No. 508,609
In Great Britain May 19, 1943

4 Claims. (Cl. 74—501)

This invention relates to flexible power transmission members comprised by cables adapted to transmit pull and push and torsion and particularly to such members which have on the exterior spaced single- or multi-start helical wires which project from the normal outer surface, and has for its object to provide such members which will have a higher transmission efficiency than those hitherto constructed.

As hitherto constructed, such cables comprise a core of any desired number of wires, for example nineteen, laid with a long-pitch helix presenting a more or less smooth outer surface and in the main acting to transmit tension, on which core is laid a single- or multi-start helical layer or layers of comparatively small pitch, from which the single- or multi-start projecting driving helices project or which form the basis for receiving a further lay or layers of single- or multi-start wires of comparatively small pitch from which the said single- or multi-start helices project.

From this it will be understood that the axis of each helix is coincident with that of the cable so that the various wires where they contact between themselves have a certain what may be termed axial or longitudinal frictional engagement. The summation of such frictional engagement to a large extent determines the tractive effort of the cable, especially for the transmission of push and torsion. Otherwise stated, the upper limit for the tooth load on a toothed transmitting member such as a gear wheel engaging the projecting helical formation to a large extent is determined by this frictional grip.

It is the primary object of the present invention to increase this frictional grip in order that the said tractive effort and tooth loading for any particular arrangement of wires or weight of cable can be increased.

In accordance with the principal feature of the invention any wire in the structure other than the helically projecting wire or wires is replaced by a member the exterior surface of which consists of projections and depressions of such character that the projections come within a circle the diameter of which is equal to or substantially equal to that of the single wire which the member replaces.

The member may be single or composite (that is built up from more than one part) and preferably, although not necessarily, the projections and depressions are in regular arrangement and of comparatively substantial extent. Moreover and preferably, the projections and depressions are so arranged that the cross section of the member is constant throughout its length.

According to a particular feature of the invention, the projections are arranged in regular helical formation around the axis of the member (composite or otherwise) and the depressions, which are also helical and regular, come between the helical projections.

According to a still further feature of the invention where the projections are formed in regular helical arrangement, the member may be comprised by two or more wires of circular section twisted together, the pitch preferably being comparatively short, or by a wire of polygonal cross section having a corner or corners, pretwisted to the desired lay or number of twists per inch, or by a gimped wire (that is by a single wire around which one or more wires are wound in the form of a close helix of short pitch). With any one of these constructions the cross section of the member is constant throughout its length.

In order that the invention may be better understood, it will now be described with reference to the accompanying somewhat diagrammatic and greatly enlarged drawing, which is given by way of example only and in which:

Fig. 1 shows a power-transmitting push-pull cable with spaced annular projections, the lower part of the figure being partially in section, the intermediate part of the figure showing the full structure and the upper part showing certain members broken away.

Fig. 2 is a section on the line 2—2, Fig. 1, of the core portion of the member shown in Fig. 1.

Fig. 3 shows a fragmentary portion of a member of the cable in elevation, Fig. 4 being an end view thereof.

Figs. 5 and 6, and 7 and 8 are two other exemplifications of members, the views being similar to Figs. 3 and 4.

With reference to Figs. 3 and 4, these show a member M formed by two wires 9 of circular cross section twisted together, the pitch being comparatively short. It should be understood, however, that more than two such wires may be twisted together and in some cases the cross section of one or more wires may differ from the cross section of one or more of the other wires.

Referring to Figs. 5 and 6, here the member designated M¹ is shown comprising a single wire of polygonal cross section (actually of square cross section) having a twist imparted thereto.

Referring to Figs. 7 and 8, here the member M² is of gimped construction comprising a central circular section wire 10 having laid therearound a single-start helically arranged wire 11 the turns of which come into contact.

In any case, attention is drawn to the fact that in the structures shown in Figs. 3 to 8, and in the modifications above described, in all cases the cross section of the member formed is constant throughout its length. However, it must be distinctly understood that the invention is not limited to the methods in which the members are formed as shown in Figs. 3 to 8 or their modifications but may be carried into effect with members of many other constructions.

In making up a cable according to the invention, one or more of the wires, normally of circular cross section either in the core or in a layer wound therearound, with the exception of the helically projecting wire or wires, is replaced by a member such as shown in Figs. 3 and 4, 5 and 6, 7 and 8, or any modifications thereof, or equivalent members.

Fully to illustrate all the possible combinations would require a great variety of drawings but in reference to Fig. 2, which shows a section of the core and an exterior layer on the line 2—2, Fig. 1, all the exterior wires have been replaced by members such as shown in Figs. 3 to 8, arranged in sequence to illustrate the possibilities of the invention. These have been lettered M, $M^1$ and $M^2$.

Fig. 1 shows in the lower portion a cable wherein one layer is made up of a single-strand helix of a wire of square cross-section. This layer is itself covered by a triple-strand helix wound in opposite direction and having arranged between groups of the three strands the helical projecting wire 12; as illustrated in the lower part of the figure the inner single strand helix is made up from members such as $M^1$ (Figs. 5 and 6), whilst the next outer triple-strand layer is made up from strands of differing cross-section as shown in Figs. 3, 4–5, 6–7, 8, respectively, that is M, $M^1$ and $M^2$.

It will be appreciated that if the core is formed and the outer layers of wires are laid therearound in accordance with Fig. 1, a much greater frictional engagement, indeed even a mechanical inter-engagement, will exist between the members, infinitely superior to the frictional grip should the various parts simply consist of wires of circular cross section.

As a consequence, the tractive effort imposed by or imparted to such a cable, especially when it is a question of effecting a "push," is much greater than with such a cable constructed in the normal manner.

The invention is not limited to the precise forms or details of construction herein described, as these may be varied to suit particular requirements.

What I claim and desire to secure by Letters Patent of the United States of America is:

1. A power transmission device comprising a flexible core, a wire helix tightly surrounding the core and having a wire of non-circular cross-section with regularly spaced outward projections thereon, and a second helix tightly surrounding the first named helix and having axially spaced turns of wire projecting radially from the assembly of the core and first mentioned helix, the turns of winding of the second named helix being frictionally retained by the cross-sectional projections of the first named wire and the axially spaced turns of the second mentioned helix being adapted to receive the impact of a thrust force at the portions of said second helix free of engagement with said first named helix.

2. A power transmission device, comprising a flexible wire core, a wire helix tightly surrounding the core and consisting of a wire of non-circular cross-section having over the entire length of the wire regularly spaced projecting portions alternating with depressed portions, a second wire helix tightly surrounding the first named helix and having on the wire circumferentially spaced projecting portions alternating with depressed portions, said two helices being firmly engaged with each other at said projecting and depressed portions respectively, and a third helical member having axially spaced turns of winding projecting radially from the assembly of the core and first mentioned helices and firmly engaged with the outer one of said first named helices at the projections and depressions of the wire of which the helix is made, said last named helical member being adapted to receive the impact of a thrust force at the projecting portions of its turns.

3. A power transmission device, comprising a flexible wire core, a wire helix tightly surrounding the core and consisting of wire of non-circular cross-section having regularly closely helically spaced projections thereon alternating with depressions, a second helix tightly surrounding the first named helix and consisting of wire of non-circular cross-section wound in opposite direction with respect to the first helix and having closely spaced projections alternating with depressions of a nature different from those of the projections and depressions of the first mentioned helix, and a third helical wire of circular cross-section surrounding the second one of said first mentioned helices, said helical member having its turns axially spaced of the helices and its turns projecting radially from the outer one of said helices and being in firm gripping engagement with the projections and depressions of said outer one of the helices, the spaced turns of the last mentioned helical member being adapted to receive the impact of a thrust force at those portions which project from the assembly of helices.

4. A power transmission device, comprising a flexible wire core, a wire helix tightly surrounding the core, and consisting of wire of non-circular cross-section having projections and depressions in alternation uniformly spaced along said helix, a second helix made of wire of non-circular cross-section tightly surrounding the first named helix and having closely spaced projections alternating with depressions and uniformly distributed along said second helix and adapted to interlock with the projections and depressions of the first mentioned helix, a helical member surrounding the outer one of said first named helices and having its turns spaced from each other and being of uniform circular cross-section in interlocking engagement with the projections and indentations of the outer one of said first named helices, a plurality of tightly wound helices each of a wire of non-circular cross-section surrounding the second named helix and being wound in the spaces between the turns of said helical member, said last mentioned helices also being provided with closely spaced indentations and depressions uniformly distributed along said helices for interlocking engagement with the projecting portions of the turns of said helical member, said helical member being adapted to receive the impact of a thrust force on the portions projecting radially from said last named helix interwound between the turns of said helical member.

SYDNEY PILE.